(12) United States Patent
Sangsefidi et al.

(10) Patent No.: US 11,101,757 B2
(45) Date of Patent: Aug. 24, 2021

(54) POLAR METHOD FOR ELECTRIC MOTOR SOFTWARE CALIBRATION CONSIDERING INVERTER VOLTAGE LOSS

(71) Applicant: KARMA AUTOMOTIVE LLC, Irvine, CA (US)

(72) Inventors: Younes Sangsefidi, Irvine, CA (US); Geng Niu, Irvine, CA (US)

(73) Assignee: KARMA AUTOMOTIVE LLC, Irvine, CA (US)

(*) Notice: Subject to any disclaimer, the term of this patent is extended or adjusted under 35 U.S.C. 154(b) by 0 days.

(21) Appl. No.: 16/528,045

(22) Filed: Jul. 31, 2019

(65) Prior Publication Data

US 2020/0328708 A1 Oct. 15, 2020

Related U.S. Application Data

(60) Provisional application No. 62/833,726, filed on Apr. 14, 2019.

(51) Int. Cl.

| | |
|---|---|
| *H02P 21/13* | (2006.01) |
| *H02P 21/00* | (2016.01) |
| *H02P 21/14* | (2016.01) |
| *H02P 21/22* | (2016.01) |
| *H02P 27/12* | (2006.01) |
| *B60L 50/51* | (2019.01) |
| *H02P 21/16* | (2016.01) |

(52) U.S. Cl.
CPC .......... *H02P 21/13* (2013.01); *B60L 50/51* (2019.02); *H02P 21/001* (2013.01); *H02P 21/141* (2013.01); *H02P 21/16* (2016.02);

*H02P 21/22* (2016.02); *H02P 27/12* (2013.01); *B60L 2220/14* (2013.01)

(58) Field of Classification Search
CPC .......... H02P 21/13; H02P 23/12; H02P 27/12; H02P 29/00; B60L 50/51; B60L 58/25; B60L 3/00

See application file for complete search history.

(56) References Cited

U.S. PATENT DOCUMENTS

| | | | |
|---|---|---|---|
| 2012/0169268 A1* | 7/2012 | Choi | H02P 21/0021 318/767 |
| 2020/0091850 A1* | 3/2020 | Endoh | H02P 29/032 |

* cited by examiner

*Primary Examiner* — Eduardo Colon Santana
*Assistant Examiner* — Said Bouziane
(74) *Attorney, Agent, or Firm* — Gordon Rees Scully Mansukhani, LLP

(57) ABSTRACT

A method of controlling an electric vehicle, wherein the electric vehicle comprises an electric motor, a controller, and an inverter, wherein the controller receives a control signal with an instruction to operate the electric motor. In one embodiment, the method includes collecting an operational data set on a plurality of output signals of the inverter and a rotation angle of the electric motor. In one embodiment, the method includes computing a voltage change of the inverter and a magnetic flux of the electric motor based on a predetermined data set and the operational data set. In one embodiment, the method includes adjusting an output of the inverter to offset the voltage change and the magnetic flux, the output being provided to the electric motor to control the electric motor in accordance with the instruction.

14 Claims, 4 Drawing Sheets

POLAR METHOD FOR ELECTRIC MOTOR SOFTWARE CALIBRATION CONSIDERING INVERTER VOLTAGE LOSS

BACKGROUND

The present disclosure relates to a method for calibrating an electric motor.

The powertrains of electric vehicles are based on electric motors (e-motors). The control of these electric motors is achieved by microprocessor-based e-motor software (SW). The effectiveness of e-motor software depends on the accuracy of its calibration, which should take into account the e-motor magnetic characterization and the voltage loss of the system switches and windings. Failure in providing an accurate software calibration leads to adverse dynamic response of the electric vehicle powertrain and even its instability (in severe cases).

Different methods have been previously proposed to increase the accuracy of software calibration in electric motor drives. These methods are mainly Cartesian coordinate approaches that calculate magnetic characteristics of the e-motor in a rotating dq frame of reference and voltage loss of inverters in a stationary abc frame of reference. These previously proposed methods have different problems such as 1) needing significant memory for storing two n*n look-up tables with a total of 2*n*n elements for flux-based calculations, 2) a high computational cost for two separate interpolations in two-dimensional look-up tables for flux-based calculations, and 3) the need for a separate technique for processing voltage-loss terms, which involves additional computational complexity from using zero crossing detection for phase currents, wherein zero crossing detection is necessary because sinusoidal current signals measured in a Cartesian coordinate frame of reference may register as either positive or negative.

It is desirable to find a method for calibrating an electric motor that requires less memory to store data of look-up tables, has a lower calculation burden on the microprocessor, and has simultaneous implementation of voltage-loss calculation without needing a separate complex technique for processing.

SUMMARY

Disclosed herein is a method of controlling an electric vehicle, wherein the electric vehicle comprises an electric motor, a controller, and an inverter. In one embodiment, the controller receives a control signal with an instruction to operate the electric motor. In one embodiment, the inverter receives a switching signal corresponding to the control signal from the controller, the inverter providing a plurality of output signals for operation of the electric motor.

In one embodiment, the method includes collecting an operational data set on the plurality of output signals of the inverter and a rotation angle of the electric motor. In one embodiment, the method includes computing a voltage change of the inverter and a magnetic flux of the electric motor based on a predetermined data set and the operational data set. In one embodiment, the method includes adjusting an output of the inverter to offset the voltage change and the magnetic flux, the output being provided to the electric motor to control the electric motor in accordance with the instruction.

In one embodiment, the predetermined data set is a one-dimensional look-up table. In another embodiment, the one-dimensional look-up table is a 1*n look-up table, wherein n is a discrete number of entries relating a given operational data value to a table value representing the behavior of the system at the given operational data value.

In one embodiment, the voltage change of the inverter is a voltage loss of the inverter.

In one embodiment, rotation angle is the advance angle between the rotating magnetic field of the stator and the rotating magnetic field of the rotor. In another embodiment, the rotation angle relates to a polar coordinate frame of reference.

In one embodiment, the plurality of output signals provided by the inverter relates to a direct axis and a quadrature axis of a dq frame of reference, wherein a first output signal is a current component that is related to the direct axis as a flux component, and wherein a second output signal is a current component that is related to the quadrature axis as a torque component.

In one embodiment, the method calculates voltage change terms in the dq frame of reference.

In one embodiment, the operational data set further includes an RPM value of the motor.

In one embodiment, computing the voltage change of the inverter and the magnetic flux of the motor is performed with a single technique for processing for finding both the voltage change of the inverter and the magnetic flux of the motor.

In one embodiment, the proposed software calibration technique for processing is based on observations from mathematical analysis and experimental verification on an inverter-motor system. In one embodiment, the proposed technique for processing uses a polar coordinate approach, which takes into account the predictable magnetic behavior of a permanent magnet (PM) motor at each angle (θ). Therefore, in one embodiment, it uses a linear representation for d-axis inductance ($L_d$). In addition, in one embodiment, it uses only a one-dimensional look-up table for q-axis inductance ($L_q$). In one embodiment, the proposed method of software calibration uses a gain to modify the magnetic characteristics of a PM motor for different angles. In one embodiment, after calculating the magnetic characteristics of the motor, the proposed technique for processing then calculates the voltage loss of an inverter in the dq frame using a simple linear equation. This implementation of voltage loss calculation may reduce the burden on the proportional-integral (PI) current controllers of the drive system and may also improve the response of the drive system, especially at low speeds.

In one embodiment, the proposed technique for processing 1) reduces memory requirements to store data of look-up tables, 2) lowers the calculation burden on the microprocessor, and 3) has simultaneous implementation of voltage-loss calculation in addition to the calibration calculation without needing a separate complex technique for processing. In one embodiment, the proposed method operates as software and does not need any external hardware (such as additional voltage and current transducers) for calibration.

In one embodiment, the proposed technique for processing needs only one 1*n look-up table, which significantly saves the required microprocessor memory space for storing the data. In addition, the proposed technique for processing may also reduce the calculation burden since the proposed technique for processing does not need to perform two separate interpolations with a pair of two-dimensional look-up tables. Moreover, the proposed technique for processing simultaneously calculates the inverter voltage loss in dq frame with a simple implementation and without need for detection of zero crossings of phase currents. In one embodiment of this control technique for processing, a mathematical analysis is first performed to study the behavior of the flux-based and loss-based motor variables. In one embodiment, the mathematical analysis may be used to determine the values for the 1*n look-up table.

Other aspects, features, and techniques will be apparent to one skilled in the relevant art in view of the following detailed description of the embodiments.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

One aspect of the disclosure is directed to method for calibrating an electric motor.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative techniques for processing described herein may be combined in a single implementation, but the application is not limited to the specific exemplary combinations of methods for calibrating an electric motor that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

Figure 1:
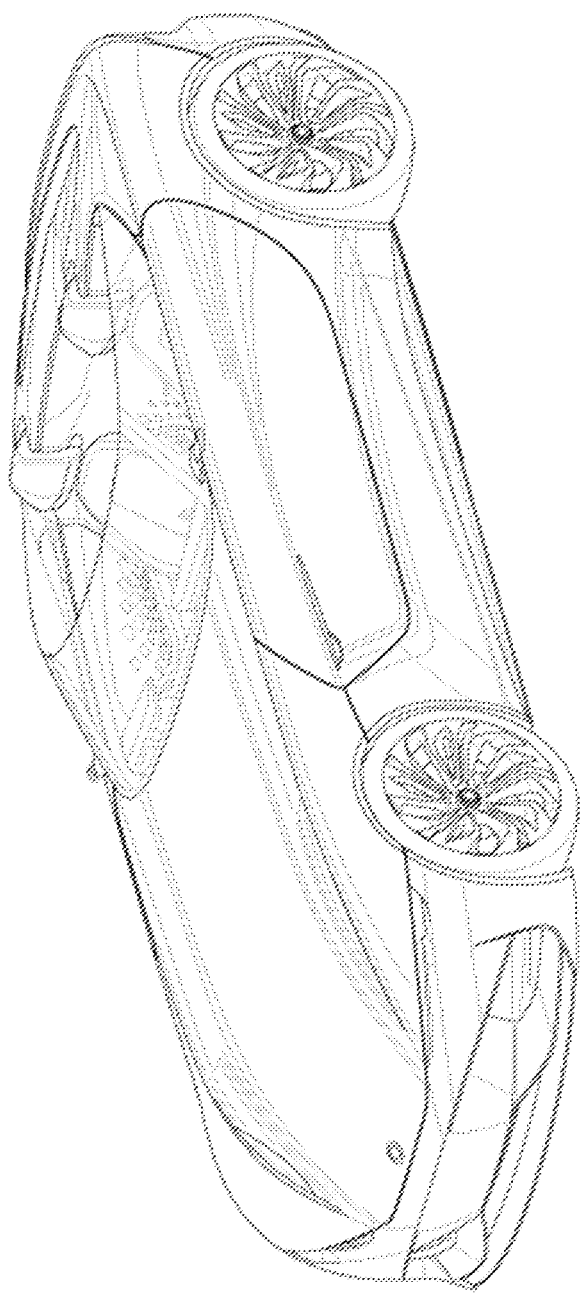
FIG. 1 is a perspective view depicting an exemplary embodiment of an electric vehicle that may include an electric motor drive system.

FIG. 1 is a perspective view depicting an exemplary embodiment of an electric vehicle 100 that may include an electric motor drive system 200. The electric vehicle 100 shown in FIG. 1 is exemplary. The electric motor drive system 200 may be installed in any vehicle with use for an electric motor drive system, including but not limited to hybrid vehicles.

Figure 2:
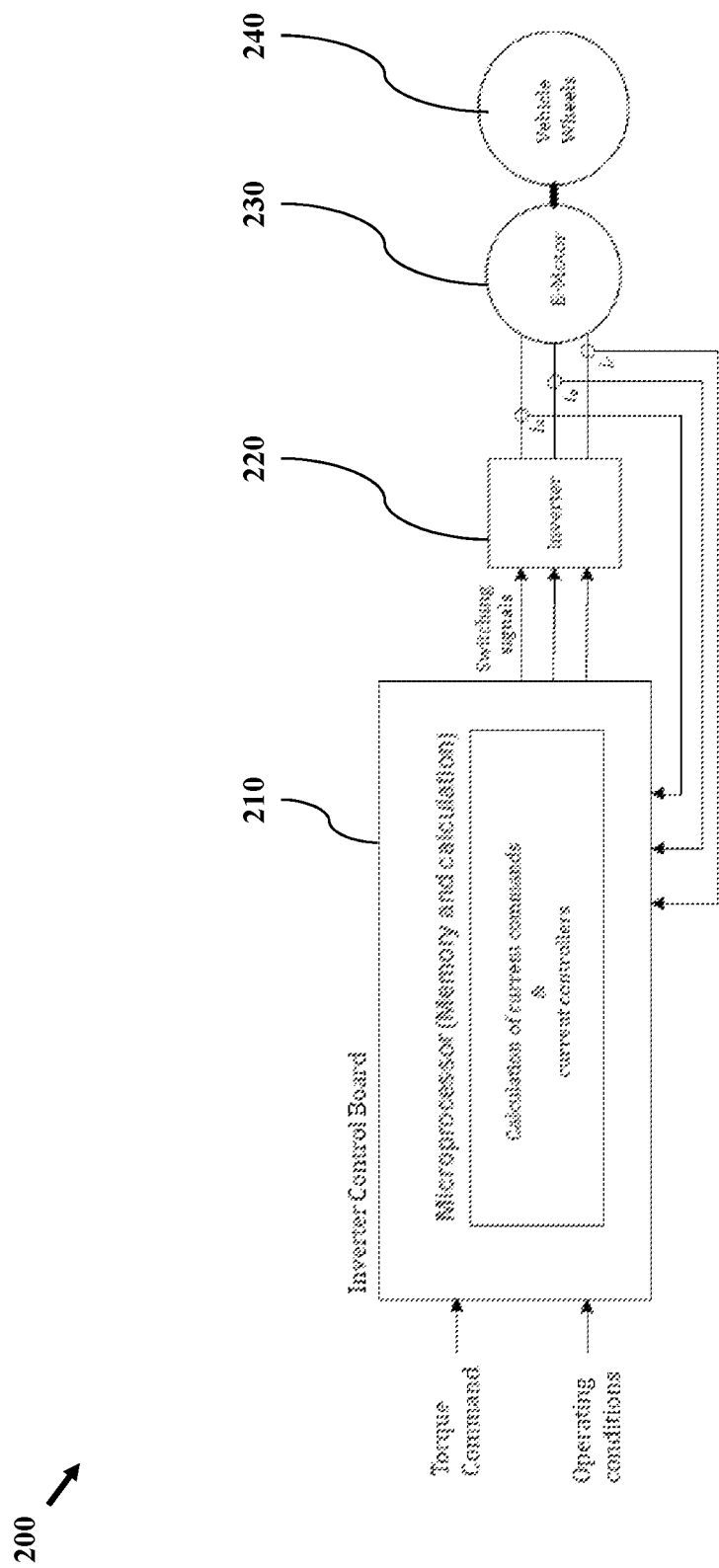
FIG. 2 is a flow diagram depicting the structure of an exemplary electric motor drive system in electric vehicles.

FIG. 2 is a flow diagram depicting the structure of an exemplary electric motor drive system 200 in electric vehicles. The proposed technique for processing may be installed as part of the inverter control board 210, which in one embodiment is designed to control the inverter 220 at its commanded value with a good dynamic and steady-state response. In one embodiment, the inverter 220 feeds power to the electric motor 230, and the electric motor 230 in turn applies torque to a plurality of vehicle wheels 240.

In one embodiment, the inverter control board 210 receives a control signal with an instruction to operate the electric motor 230. In one embodiment, the control signal comprises a torque command and data for operating conditions. In one embodiment, the torque command may be an instruction for the electric motor 230 to operate with a specific torque value in order to achieve a desired velocity for the electric vehicle 100.

In one embodiment, the inverter control board 210 performs a series of calculations using the received instruction in order to produce a switching signal for the inverter 220. The switching signal may be designed to use space vector pulse width modulation (SVPWM) to operate the legs of the inverter 220 to produce a plurality of output signals corresponding to the received instruction to operate the electric motor 230. In one embodiment, the plurality of output signals is a set of current components. In one embodiment, the plurality of output signals includes a first output signal and a second output signal, wherein the first output signal is a current component that is related to the direct axis as a flux component, and wherein the second output signal is a current component that is related to the quadrature axis as a torque component. In one embodiment, the plurality of output signals may be mapped to a dq frame of reference.

In one embodiment, the inverter 220 may experience voltage change during the process of producing the plurality of output signals. In one embodiment, the electric motor 230 may further experience magnetic flux; the voltage change and magnetic flux may affect the final values of the plurality of output signals. In one embodiment, the voltage change may be represented as a voltage loss of the inverter. In one embodiment, the voltage loss may be due to switching losses.

Figure 3B:
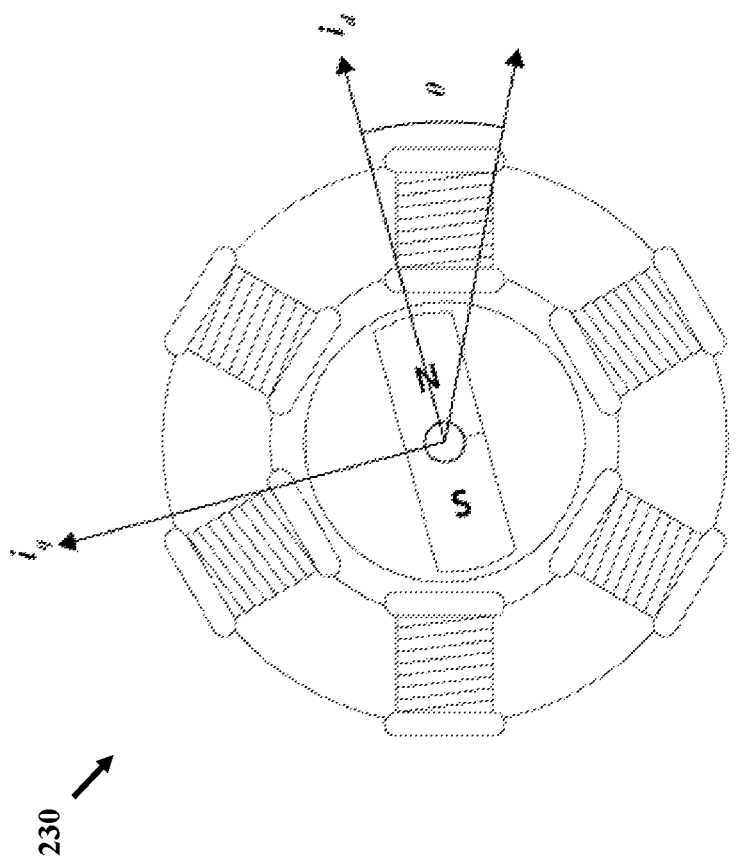
FIG. 3B is a side view depicting an exemplary magnetic field coordinate system for the electric motor of FIG. 3A.
Figure 3A:
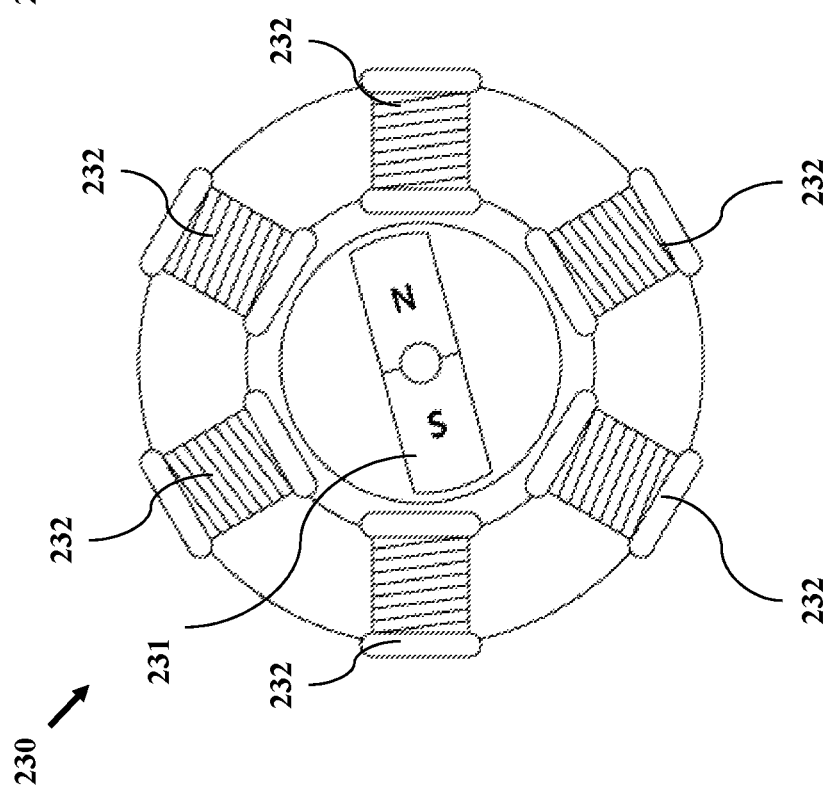
FIG. 3A is a side view depicting an exemplary embodiment of an electric motor for an electric vehicle.

FIG. 3A is a side view depicting an exemplary embodiment of an electric motor 230 for an electric vehicle 100. In one embodiment, the electric motor 230 includes a rotor 231 and a stator with a plurality of stator coils 232. In one embodiment, the rotor 231 may include a permanent magnet. In one embodiment, the stator coils 232 may receive power from the inverter 220 to produce a magnetic field by means of space vector pulse width modulation. In one embodiment, the electric motor drive system 200 rotates the magnetic field of the stator in order to induce rotation in the rotor 231 and propel the electric vehicle 100.

FIG. 3B is a side view depicting an exemplary magnetic field coordinate system for the electric motor 230 of FIG. 3A. In one embodiment, the electric motor 230 has a rotation angle value θ. Rotation angle θ may represent an advance angle of the motor, wherein the advance angle is the angle between the rotating magnetic field of the stator and the rotating magnetic field of the rotor.

Figure 4:
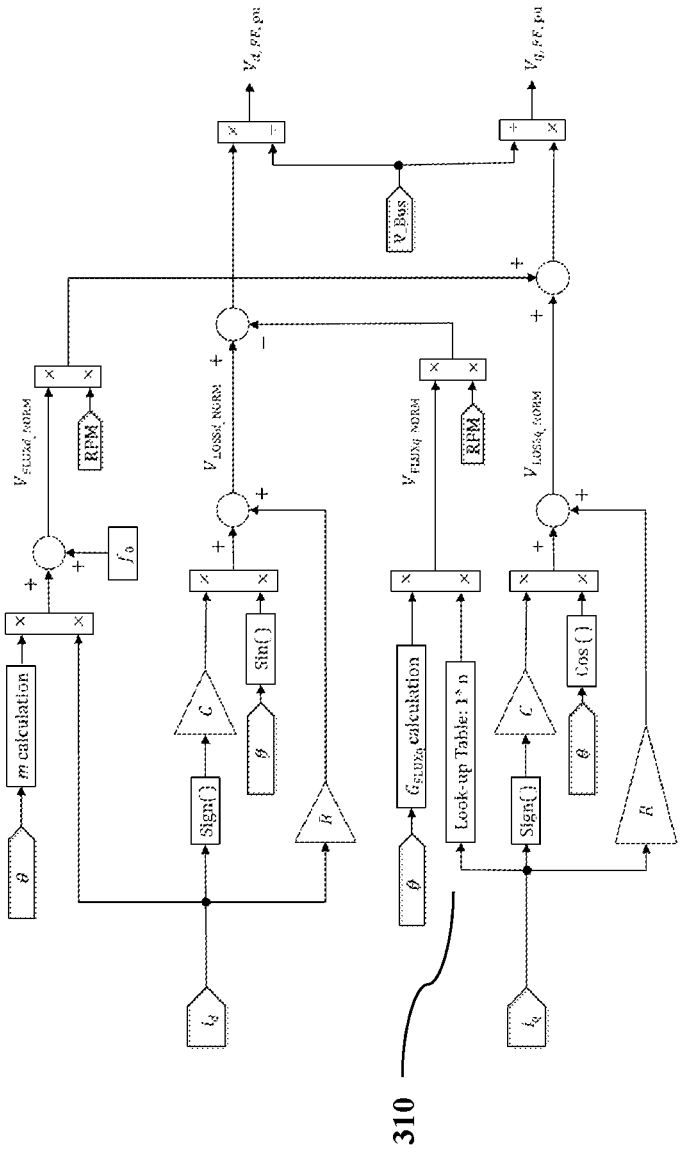
FIG. 4 is a signal block diagram depicting the structure of an exemplary embodiment of the proposed software calibration structure.

FIG. 4 is a signal block diagram depicting an exemplary embodiment of the proposed software calibration structure 300. In one embodiment, the proposed approach only needs one 1*n look-up table. In one embodiment, this single structure alone provides both flux-based voltage terms $V_{FLUXd,NORM}$ and $V_{FLUXq,NORM}$ and loss-based voltage terms $V_{LOSSd,NORM}$ and $V_{LOSSq,NORM}$. In one embodiment, these terms can be used to either calculate feed-forward signals or estimated torque, which may be the two main outputs of a software calibration technique for processing in electric motor drive systems.

In one embodiment, the software calibration structure 300 collects an operational data set related to the electric motor drive system 200. In one embodiment, the collected operational data set may include (but is not limited to) data regarding the plurality of output signals of the inverter, data regarding a rotation angle θ of the motor, and data regarding an RPM value of the motor. In one embodiment, the rotation angle of the motor is the advance angle between the rotating magnetic field of the stator and the rotating magnetic field of the rotor. The rotation angle may relate to a polar coordinate frame of reference. The rotational angle may additionally or alternatively be mapped to a polar coordinate frame of reference. The plurality of output signals of the inverter may be represented as current component id and current component $i_q$.

In one embodiment, the software calibration structure 300 uses at least a portion of the operational data set as a basis for selecting a value from a predetermined data set. In one embodiment, the predetermined data set is integrated into the software calibration structure 300 as a look-up table 310. In one embodiment, the predetermined data set is prepared by measuring the voltage and magnetic flux properties of the electric motor 230 in a controlled setting. In one embodiment, the look-up table 310 is a one-dimensional look-up table. In one embodiment, the look-up table 310 is a 1*n look-up table, wherein n is a discrete number of entries relating a given value of the operational data set to a table value representing the behavior of the system at the given value of the operational data set. In one embodiment, the given value of the operational data set is a value of $i_q$. In one embodiment, the calculation of $G_{FLUXq}$ based on a rotation angle θ value allows for the use of a 1*n look-up table and a linear equation to find $V_{FLUXq,NORM}$ instead of an n*n table that is required for use with function $G_{FLUXq}(x, y)$. In one embodiment, the calculation of m based on a rotation angle θ value eliminates the need for a look-up table altogether to find $V_{FLUXd,NORM}$, as opposed to the n*n table required for use with function $G_{FLUXd}(x, y)$.

While this disclosure makes reference to exemplary embodiments, it will be understood by those skilled in the art that various changes in form and details may be made therein without departing from the scope of the claimed embodiments.

What is claimed is:

1. A method of controlling an electric vehicle comprising:
an electric motor,
a controller, wherein the controller receives a control signal with an instruction to operate the electric motor, and
an inverter that receives a switching signal corresponding to the control signal from the controller, the inverter providing a plurality of output signals for operation of the electric motor;
and wherein the method includes:
collecting an operational data set, wherein the operational data set includes the plurality of output signals of the inverter and a rotation angle of the electric motor,
computing a voltage change of the inverter and a magnetic flux of the electric motor based on a predetermined data set and the operational data set, and
adjusting an output of the inverter to offset the voltage change and the magnetic flux, the output being provided to the electric motor to control the electric motor in accordance with the instruction;
the plurality of output signals provided by the inverter relates to a direct axis and a quadrature axis of a dq frame of reference, wherein a first output signal is a current component that is related to the direct axis as a flux component, and wherein a second output signal is a current component that is related to the quadrature axis as a torque component;
wherein the predetermined data set is only a single one-dimensional look up table; and
wherein the one-dimensional look-up table is a 1*n look-up table, and wherein n is a discrete number of entries relating a given operational data value to a table value representing the behavior of the system at the given operational data value.

2. The method of claim 1, wherein the voltage change of the inverter is a voltage loss of the inverter.

3. The method of claim 1, wherein the rotation angle is the advance angle between the rotating magnetic field of the stator and the rotating magnetic field of the rotor.

4. The method of claim 1, wherein the rotation angle relates to a polar coordinate frame of reference.

5. The method of claim 1, wherein the method calculates voltage change terms in the dq frame of reference.

6. The method of claim 1, wherein the operational data set further includes an RPM value of the motor.

7. The method of claim 1, wherein computing the voltage change of the inverter and the magnetic flux of the motor is performed with a single technique for processing for finding both the voltage change of the inverter and the magnetic flux of the motor.

8. A system for controlling an electric motor drive system of an electric vehicle, wherein the electric vehicle comprises:
an electric motor,
a controller, wherein the controller receives a control signal with an instruction to operate the electric motor, and
an inverter that receives a switching signal corresponding to the command signal from the controller, the inverter providing a plurality of output signals for operation of the electric motor;
wherein the controller is configured to control the electric vehicle based on a method comprising:
collecting an operational data set, wherein the operational data set includes the plurality of output signals of the inverter and a rotation angle of the electric motor, computing a voltage change of the inverter and a magnetic flux of the electric motor based on a predetermined data set and the operational data set, and adjusting an output of the inverter to offset the voltage change and the magnetic flux, the output being provided to the electric motor to control the electric motor in accordance with the instruction;

the plurality of output signals provided by the inverter relates to a direct axis and a quadrature axis of a dq frame of reference, wherein a first output signal of the plurality of output signals is a current component that is related to the direct axis as a flux component, and wherein a second output signal of the plurality of output signals is a current component that is related to the quadrature axis as a torque component;

wherein the predetermined data set is only a single one-dimensional look up table; and wherein the one-dimensional look-up table is a 1*n look-up table, and wherein n is a discrete number of entries relating a given operational data value to a table value representing the behavior of the system at the given operational data value.

9. The system of claim 8, wherein the voltage change of the inverter is a voltage loss of the inverter.

10. The system of claim 8, wherein the rotation angle of the motor is the advance angle between the rotating magnetic field of the stator and the rotating magnetic field of the rotor.

11. The system of claim 8, wherein the rotation angle relates to a polar coordinate frame of reference.

12. The system of claim 8, wherein the system calculates voltage change terms in the dq frame of reference.

13. The system of claim 8, wherein the operational data set further includes an RPM value of the motor.

14. The system of claim 8, wherein computing the voltage change of the inverter and the magnetic flux of the motor is performed with a single technique for processing for finding both the voltage change of the inverter and the magnetic flux of the motor.

* * * * *